US012034734B2

(12) United States Patent
Rahimi et al.

(10) Patent No.: US 12,034,734 B2
(45) Date of Patent: *Jul. 9, 2024

(54) SYSTEMS AND METHODS FOR IDENTIFYING SYNTHETIC IDENTITIES ASSOCIATED WITH NETWORK COMMUNICATIONS

(71) Applicant: MASTERCARD INTERNATIONAL INCORPORATED, Purchase, NY (US)

(72) Inventors: Reza Rahimi, Chesterfield, MO (US); Marlowe Valdeabella, Grover, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,942

(22) Filed: May 1, 2023

(65) Prior Publication Data

US 2023/0275899 A1 Aug. 31, 2023

Related U.S. Application Data

(63) Continuation of application No. 17/723,306, filed on Apr. 18, 2022, now Pat. No. 11,641,358, which is a (Continued)

(51) Int. Cl.
*G06F 13/00* (2006.01)
*H04L 9/40* (2022.01)
*H04L 67/50* (2022.01)

(52) U.S. Cl.
CPC ............ *H04L 63/102* (2013.01); *H04L 63/08* (2013.01); *H04L 63/12* (2013.01); *H04L 67/535* (2022.05)

(58) Field of Classification Search
CPC ....... H04L 63/102; H04L 63/08; H04L 63/12; H04L 67/535; H04L 67/30; G06F 21/31
(Continued)

(56) References Cited

U.S. PATENT DOCUMENTS

| 10,270,808 B1 | 4/2019 | Sherif et al. |
| 10,408,928 B2 | 9/2019 | Park et al. |

(Continued)

OTHER PUBLICATIONS

U.S. Appl. No. 17/723,306, filed Dec. 21, 2022, Rahimi et al.
(Continued)

*Primary Examiner* — Kenneth R Coulter
(74) *Attorney, Agent, or Firm* — Harness, Dickey & Pierce, P.L.C.

(57) ABSTRACT

Systems and methods are provided for use in identifying synthetic identities. One example method includes receiving a request from a relying party for an identity asserted by a user to the relying party, where the request includes identity data indicative of the identity, feature data associated with the user asserting the identity, and a device ID for a communication device of the user. The method also includes calculating a fraud profile score, based on the identity data and a data structure of known fraud profiles, and aggregating the fraud profile score and at least one of a device behavior score, a user profile score, and/or an exposure behavior score into a metric indicative of a likelihood that the identity asserted by the user is a synthetic identity. The method then includes transmitting the metric to the relying party.

18 Claims, 3 Drawing Sheets

Figure 1:
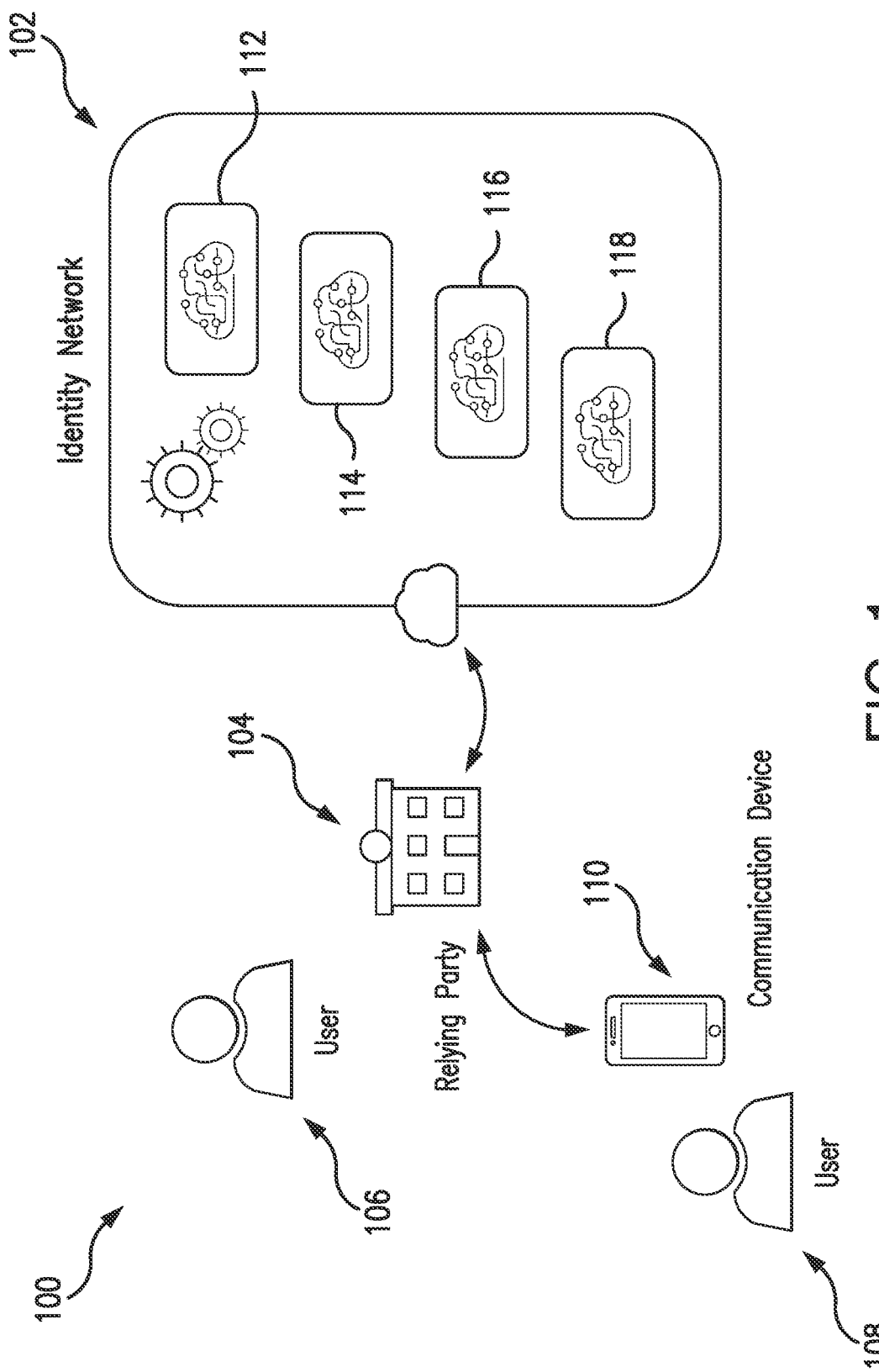

Related U.S. Application Data continuation of application No. 16/584,163, filed on Sep. 26, 2019, now Pat. No. 11,349,842.

(58) Field of Classification Search
USPC .................. 726/5, 2–4, 22–29; 709/223, 224
See application file for complete search history.

(56) References Cited

U.S. PATENT DOCUMENTS

| | | | |
|---|---|---|---|
| 10,484,426 | B2 | 11/2019 | Sherif et al. |
| 11,349,842 | B2 | 5/2022 | Rahimi et al. |
| 11,470,116 | B2 | 10/2022 | Sherif et al. |
| 11,641,358 | B2 * | 5/2023 | Rahimi .................. H04L 63/08 726/5 |
| 2018/0313944 | A1 | 11/2018 | Park et al. |
| 2019/0281086 | A1 | 9/2019 | Sherif et al. |
| 2020/0084239 | A1 | 3/2020 | Sherif et al. |
| 2021/0099454 | A1 | 4/2021 | Rahimi et al. |
| 2021/0152543 | A1 | 5/2021 | Doshi et al. |
| 2021/0232706 | A1 | 7/2021 | Peruski et al. |
| 2021/0241120 | A1 | 8/2021 | Chen et al. |
| 2022/0247754 | A1 | 8/2022 | Rahimi et al. |

OTHER PUBLICATIONS

U.S. Appl. No. 16/584,163, filed Sep. 26, 2019, Rahimi et al.
U.S. Appl. No. 17/723,306: (a) Office Action dated Sep. 28, 2022; and (b) Notice of Allowance dated Dec. 21, 2022. The instant application is a continuation of U.S. Appl. No. 17/723,306.
U.S. Appl. No. 16/584,163: (a) Office Action dated Oct. 6, 2021; and (b) Notice of Allowance dated Dec. 29, 2020 dated Apr. 7, 2022. The instant application claims priority to U.S. Appl. No. 16/584,163.

* cited by examiner

SYSTEMS AND METHODS FOR IDENTIFYING SYNTHETIC IDENTITIES ASSOCIATED WITH NETWORK COMMUNICATIONS

CROSS-REFERENCE TO RELATED APPLICATIONS

This application is a continuation of U.S. patent application Ser. No. 17/723,306 filed Apr. 18, 2022, which is a continuation of U.S. patent application Ser. No. 16/584,163 filed Sep. 26, 2019 (now U.S. Pat. No. 11,349,842 issued May 31, 2022). The entire disclosure of each of the above applications is incorporated herein by reference.

FIELD

The present disclosure generally relates to systems and methods for identifying synthetic identities associated with network communications and, in particular, to systems and methods for use in identifying identities as synthetic identities based on data associated with the identities and presentment of the identities in the network communications, prior to or in connection with use of the identities (identified as synthetic identifies) for illicit purposes.

BACKGROUND

This section provides background information related to the present disclosure which is not necessarily prior art.

People are known to be associated with identities, whereby businesses interacting with the people often seek to verify the identities of the people in connection with or prior to the interactions. For example, banking institutions are often required to know their customers (i.e., satisfy KYC requirements), whereby the banking institutions will verify the identities of the customers prior to opening accounts for the customers or extending loans or credit to the customers.

In connection with specific interactions between users and businesses, especially financial interactions, the users may present false identities or seek to impersonate other users, in order to defraud the other users and/or the businesses. However, in such interactions, the businesses often rely on specific procedures, checks and validations for verifying the users and their identities (as real or fake) to avoid such fraudulent interactions associated with such false identities. These specific procedures, checks and validations often include verifying physical documents associated with the presented identities, when the users are present at the businesses, and further still relying of digital identity services and government databases for verification when the users are not present (or even when the users are present at the businesses).

DRAWINGS

The drawings described herein are for illustrative purposes only of selected embodiments and not all possible implementations, and are not intended to limit the scope of the present disclosure.

Figure 2:
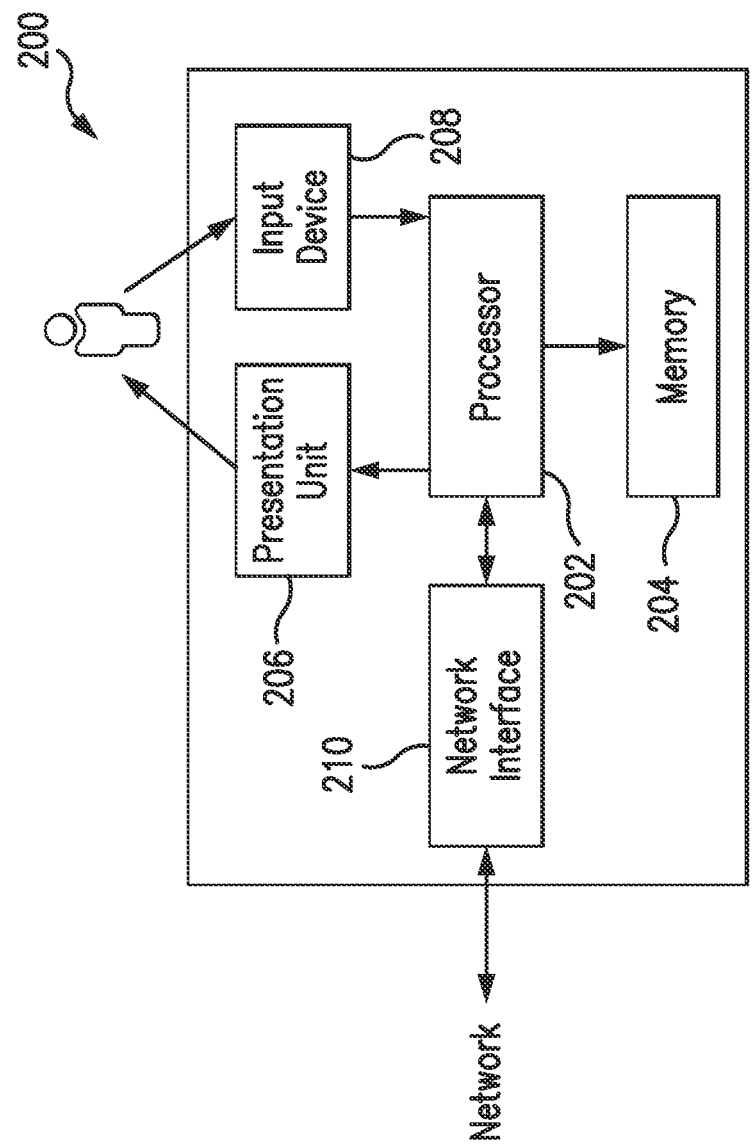
Figure 3:
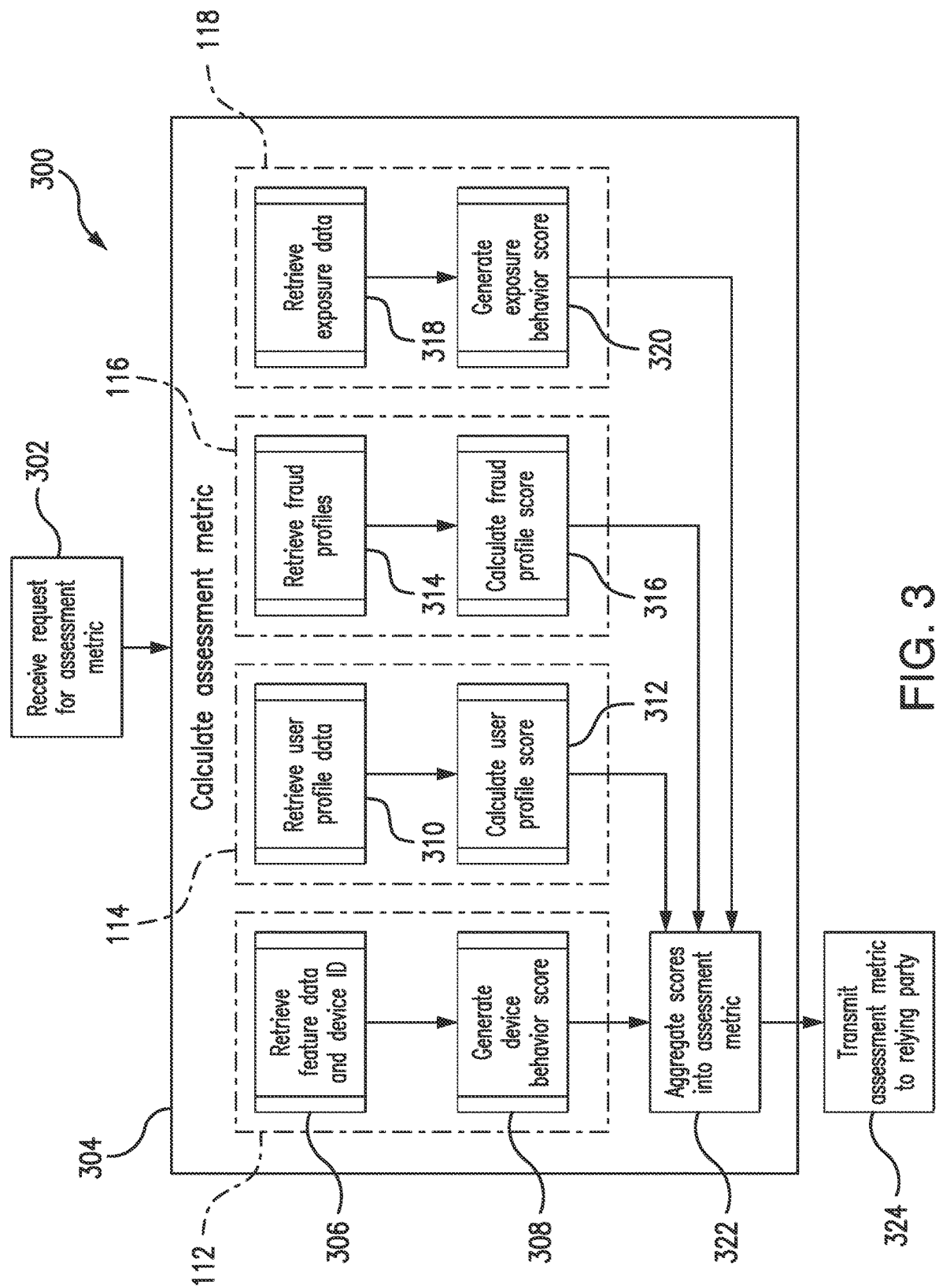

FIG. 1 illustrates an exemplary system of the present disclosure suitable for use in identifying synthetic identities presented by users in connection with network communications;

FIG. 2 is a block diagram of a computing device that may be used in the exemplary system of FIG. 1; and FIG. 3 includes a flow diagram of an exemplary method, which may be implemented in connection with the system of FIG. 1, for determining an assessment metric for an identity of a user, where the assessment metric is indicative of a likelihood that the identity presented by the user is a synthetic identity.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users often apply for accounts or otherwise interact with entities for one or more purposes, whereby the entities rely on identities submitted by the users in efforts to verify the users. For example, John Smith may present a driver's license, a social security card, or a passport to an entity as evidence of his identity, in connection with opening an account (or requesting other services or products) at the entity. As part of evaluating John Smith's identity, the entity may rely on various factors of his identity, such as historical attributes, to assess the trustworthiness of the identity, whereby the identity may be determined to be real or fake based on such attributes. Synthetic identities are different, and may be used by fraudulent users in connection with network communications, whereby the synthetic identities include combinations of one or more real identity attributes and one or more fictitious or fabricated identity attributes. An exemplary synthetic identity may include John Smith's correct social security number, but a fake name and fake mailing address unassociated with Joh Smith. What's more, the synthetic identities may be built over time, such as over a period of weeks, months or even years, using the real identity attributes, whereby the apparent longevity of the synthetic identity makes it problematic for the entities interacting with the users to identify the identity as synthetic or fraudulent (e.g., when using such conventional historical evaluations of the identities, etc.).

Uniquely, the systems and methods herein permit identification of synthetic identities based on various aspects of the synthetic identities and presentment of the same. In particular, when a user presents an identity to a relying party in connection with a network communication to the relying party (e.g., in connection with an online application for an account, etc.), certain data is gathered about the application process by the relying party (e.g., feature data, etc.) and is provided, along with identity data received from the user, in a request from the relying party to an identity network. The identity network, in turn, generates an assessment metric for the user and the presented identity, which is indicative of a likelihood that the identity is a synthetic identity (or not). Specifically, as provided herein, the assessment metric is the aggregate of one or more of a device behavior score, a user profile score, a fraud profile score, and/or an exposure score. The identity network then transmits, in response to the request, the assessment metric for the identity to the relying party, whereupon the relying party is able to assess the identity of the user based on the metric. In this manner, the relying party is provided with an assessment of the identity presented by the user sufficient to either assume the risk of interacting with the user, or to terminate the interaction or require further verification of the user's identity.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between users and relying parties, types of relying parties involved in interactions with users, application processes implemented by relying parties, privacy requirements, etc.

The system 100 generally includes an identity network 102 and a relying party 104, each of which is coupled to (and is in communication with) one or more networks. The network(s) is/are indicated generally by arrowed lines in FIG. 1, and may each include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The identity network 102 is configured as a resource for identity verification, and to provide one or more services in connection with verifying identifies. In connection therewith in the system 100, the relying party 104 is configured to request identity verification from the identity network 102, based on its interactions with users, whereby the identity network 102 is configured to provide an assessment of a user's identity (e.g., an assessment metric for such identity, etc.), consistent with the description below. The identity network 102 may include a standalone service and/or entity. Additionally, or alternately, the identity network 102 may be incorporated, in whole or in part, with another entity in the system 100, such as, for example, a payment network or a banking institution, etc. Specifically, for example, in one embodiment, the identity network 102 may be incorporated into the Mastercard® payment network.

The relying party 104 may include any entity that relies on an identity of a user in order to conduct business and/or interact with the user. As an example, the relying party 104 may include a banking institution, which offers accounts such as credit accounts (e.g., credit cards, etc.), checking accounts, savings accounts, etc., individually or in connection with a purchase by a user at the institution (whereby the relying party 104 may instead be a merchant, etc.). In another example, the relying party 104 may include a telecommunication provider offering telecommunication services (e.g., cellular phone services, Internet services, television services, etc.). In yet another example, the relying party 104 may include a merchant extending credit to a user, such as, for example, an automobile sales merchant, or an insurance merchant, etc. And, in a still further example, the relying party 104 may include a social network, email provider, or other online host, in which a user is permitted to enroll for an account (e.g., a social network account or profile, an email account, etc.) to participate in interactions on a network provided by the relying party 104. Regardless of the type of the relying party 104, though, it should be appreciated that the relying party 104 has an interest in verifying the identity of a user with which the relying party 104 is interacting, in connection with or prior to proceed in the interaction. A failure by the relying party 104 to properly identify the user may result in, among other things, financial loss to the relying party 104 and/or the user, loss of reputation, targeting by fraudsters, etc.

The system 100 also includes a user 106 having an identity, i.e., a real identity, and a user 108, which has a real identity but is also associated with, as far as the description herein relates, a synthetic identity (or multiple synthetic identities). And, the synthetic identity of the user 108 includes at least one attribute of the identity of the user 106. In addition, the user 108 is associated with a communication device 110, which may include, for example, a smartphone, tablet, laptop computer, server, etc. In general, the user 108 may use the communication device 110 to initiate interactions with other parties, such as the relying party 104, etc. The communication device is associated with a unique ID, such as, for example, a MAC address, an IP address, an electronic identification number (EIN), a unique device ID (UDID), etc.

The real identity of the user 106 indicates and/or includes (without limitation) one or more attributes of the user 106, including a name, an address, a birthdate, a place of birth, a phone number, an email address, a social security number or other government identification (ID) number, an employee ID number, etc. The user's real identity may be evidenced by a number of physical documents and/or devices, all of which may be used alone, or in combination, as described herein. For example, such physical documents may include a birth certificate; a passport; a driver's license issued by a state, regional, or federal government (or other government issued ID); a government identification card; a social security card; a health insurance card; a bank statement; an employee ID card; a library card; a utility bill; etc. Conversely, as indicated above, the synthetic identity of the user 108 includes at least one attribute of the real identity of the user 106 and at least one fake attribute, which is not included in the real identity of the user 106. In this exemplary embodiment, for example, the synthetic identity of the user 108 includes a government ID number of the user 106, but a fictitious name and a mailing address associated with a Post Office box of the user 108 (where neither the name nor the mailing address is associated with the user 106). Further, in this exemplary embodiment, the user 108 has used the synthetic identity over a period of months or years, whereby the synthetic identity includes a history showing one or more accounts associated therewith, activities linked thereto, on-time payments, etc. by the user 108 (or others) using the synthetic identity.

In the exemplary embodiment herein, the user 108 may be referred to as a fraudster, whereby the user 108 will attempt to leverage the synthetic identity to interact with the relying party 104 in order to open an account, secure a loan, receive an extension of credit, etc. In connection with an attempted fraud instance, the user 108 may interact with the relying party 104, via the communication device 110 and one or more interfaces provided by the relying party 104. Specifically, for example, the user 108 may access a website associated with the relying party 104, via the communication device 110, in order to apply for a new account through one or more application interfaces of the website. In so doing, the user 108 accesses the application and proceeds to respond to questions in the application interface(s) with data included in the synthetic identity of the user 108. The application interface(s) may include several fields, which are required or not, and will often solicit the details to the identity of the user 108, i.e., the synthetic identity. In connection therewith, the relying party 104 is configured to capture the identity data provided by the user 108, data specific to the communication device 110 being used to provide the data (e.g., the MAC address, the UDID, the EIN, the IP address, etc.), and also feature data for the user's activities at and/or interactions with the website interface(s) (e.g., optional fields being skipped, speed of responses, transitions from field to field (e.g., tab or click, etc.), sequence of movement through the fields, etc.). Together, the received/captured data is associated with the application of the user 108 for the account and is stored in memory associated with the relying party 104.

While the above is described with respect to a web site of the relying party 104, it should be appreciated that other network-based interactions may be provided for between the user 108 and the relying party 104, such as through a network-based application associated with the relying party 104 installed and active at the user's communication device 110 (or otherwise), whereby the same data may be gathered and/or captured by the relying party 104 via the interactions of the user 108 with the application.

When the account request (or application) is completed by the user 108, or submitted, the relying party 104 is configured to seek a verification of the identity of the user 108 from the identity network 102. The relying party 104 may also be configured to employ one or more verification procedures internally, but is still configured to request an assessment of the validity of the identity of the user 108 from the identity network 102. In connection therewith, the relying party 104 is configured to transmit a request including at least a portion of the identity data received from the user 108, the feature data associated with the user 108 interacting with the application provided by the relying party 104, and the device ID for the user's communication device 110 (as received from the user 108 during the account request process).

In turn, the identity network 102 is configured to parse the data from the request received from the relying party 104 and store the identity data, the feature data, and the device ID for the user 108 in memory (e.g., together in one or more data structures associated with the identity network 102, separately in one or more data structures associated with the identity network 102 to thereby facilitate access to the appropriate data by scoring engines 112-118, etc.). The identity network is then configured to generate an assessment metric for the identity presented by the user 108 to the relying party 104. Specifically, in this exemplary embodiment, the identity network 102 includes four separate scoring engines 112-118, which each calculate a particular score relating to the presented identity. The scoring engine 112 is configured to generate a device behavior score based, at least in part, on the feature data and the device ID received from the relying party 104. The scoring engine 114 is configured to generate a user profile score based on the instant and historical applications of the provided identity. The scoring engine 116 is configured to generate a fraud profile score based on instances of identified fraud involving the provided identity. And, the scoring engine 118 is configured to generate an exposure score based on presence of the identity, or part thereof, on nefarious networks and/or a reputation and tenure of the identity or parts thereof, etc.

Then, once the separate scores are generated by the scoring engines 112-118, the identity network 102 is configured to aggregate the scores, either weighted or not, into the assessment metric and to transmit the assessment metric to the relying party 104. In response, the relying party 104 is configured to rely on the assessment metric in deciding whether to continue in the interaction with the user 108, or not (e.g., based on comparison to a threshold, etc.).

While only one identity network 102, one relying party 104, one user 106, one fraudster user 108 (and one synthetic identity), and one communication device 110 are illustrated in FIG. 1, it should be appreciated that any number of these entities (and their associated components), and any number of the different types of users, may be included in the system 100, or may be included as a part of systems in other embodiments, consistent with the present disclosure.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, the identity network 102 (and each of the engines 112-118 associated therewith), the relying party 104, and the communication device 110 may each be included in and/or may each be implemented in a computing device, consistent with and/or similar to the computing device 200, coupled to (and in communication with) one or more networks. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity data for users, feature data for users, device IDs for different devices associated with users, attributes of identities, histories of identities, images of documents associated with identities, identity scores, identity assessment metrics, and/or other types of data (and/or data structures) suitable for use as described herein.

Furthermore, in various embodiments, computer-executable instructions may be stored in the memory 204 for execution by the processor 202 to cause the processor 202 to perform one or more of the operations described herein (e.g., one or more of the operations described in method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby the instructions effectively transform the computing device 200 into a special purpose device configured to perform the unique and specific operations described herein. It should be appreciated that the memory 204 may include a variety of different memories, each implemented in one or more of the operations or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., synthetic identity assessment metrics, etc.), visually or audibly, for example, to a user of the computing device 200 (e.g., a user associated with the relying party 104, etc.), etc. And, various interfaces (e.g., as defined by one or more websites, etc.) (e.g., including instructions to capture attributes of a user's identity, etc.) may be displayed at computing device 200, and in particular at presentation unit 206, to display certain information to the user of the device. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs) of the computing device 200 such as, for example, requests for fraud scoring, requests for accounts from the user 108, etc., in response to prompts from a network based application, website, etc., as further described below. The input device 208 may include a single input device or multiple input devices. The input device 208 is coupled to (and is in communication with) the processor 202 and may include, for example, one or more of a keyboard, a pointing device, a mouse, a stylus, a camera, a biometric reader (e.g., a fingerprint scanner, etc.), a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a radio-frequency (RF) adapter, a mobile network adapter, etc.), or other device capable of communicating to one or more different ones of the networks herein and/or with other devices described herein. In some exemplary embodiments, the computing device 200 may include at least one processor (e.g., the processor 202, etc.), at least one memory (e.g., the memory 204, etc.), and/or one or more network interfaces (e.g., network interface 210, etc.) included in, or incorporated into or with the at least one processor.

FIG. 3 illustrates an exemplary method 300 for use in determining an assessment metric for an identity presented, for example, by a user to a relying party, where the metric is indicative of the likelihood (or not) that the identity is a synthetic identity. The exemplary method 300 is described as implemented in the identity network 102 of the system 100. And, reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, it should be understood, as described above, that the user 108 is a fraudster and has built a synthetic identity including at least one attribute of the identity of the user 106 over a period of weeks, months or years. In particular, as used herein, the synthetic identity includes a social security number of the user 106, a fictitious name, and a mailing address associated with a physical location but not the residence of the user 106, etc. In addition, the user 108 has applied for multiple accounts, with the synthetic identity, and has provided limited repayment on credit or loans from the accounts, but, in general, no loans are delinquent (such that an account and payment history exists for the synthetic identity). Among the multiple existing accounts, specifically, the user 108 has applied for one loan with the relying party 104 on a prior date (e.g., for a credit account, etc.) and three loans with other relying parties (not shown) on prior dates (e.g., for an automobile loan, and for credit accounts, etc.), all over the last fourteen months and with each application facilitated through the communication device 110. Additionally, for each of the prior applications, the relying party 104 and the other relying parties all utilized the identity network 102, on the prior dates, to verify the provided synthetic identity, whereby the loan history for the synthetic identity is stored in memory of the identity network 102 and associated with the fictitious name, mailing address and/or social security number of the synthetic identity.

The user 108 now desires to open another account with the relying party 104, and in so doing accesses a website provided from the relying party 104, via the communication device 110, and selects to apply for a credit account. In response, the relying party 104, via the website, causes one or more application interfaces to be displayed to the user 108 at the communication device 110. The interface(s) solicits, in different fields, a name, a mailing address, a phone number, an email address, a social security number, an annual income, a birth date*, a mother's maiden name*, a driver's license number*, a state of issuance*, banking references*, and other suitable data, where the * indicates that supplying data to those fields is optional. In this example, the user 108 fills in data from the synthetic identity into the fields by pasting the data and moving field to field by tabbing between the fields in succession, but only filling in the required fields of the application interface(s). The user 108 then selects a button at the bottom of the interface(s) to submit the application for the credit account to the relying party 104.

In connection therewith, the relying party 104 captures the identity data provided from the user 108 in the required fields, along with feature data about the interaction of the user 108 with the interface(s), and a MAC address of the communication device 110. In this exemplary embodiment, the feature data includes a generally quick rate of progression or cadence by the user 108 in completing the interface(s) (or in moving from field to field in the interface(s), etc.) (e.g., as measured in seconds, minutes, etc.), the fact that optional fields were left blank, the fact that the user 108 filled in the fields in succession (i.e., did not return to a prior field), and the fact that the user 108 pasted data into the fields and tabbed from field to field (broadly, a method of moving in or through the interface(s)) without errors in entering the data, etc. The feature data described herein may also be referred to as application intelligence data, gathered by the relying party 104. It should be appreciated that other data may also be gathered by the relying party 104 based on the interaction(s) of the user 108 with the relying party 104 and/or its interface(s) (e.g., a time taken by the user 108 to complete the credit account application, etc.).

Upon receiving the completed application from the user 108, the relying party 104 submits a request for an assessment metric to the identity network 102 for the identity received from the user 108. The request includes, without limitation, the identity data for the synthetic identity as submitted by the user 108 (or a part thereof), the feature data obtained (or generated) by the relying party 104 for the user 108 in preparing the application, and the MAC address (or other device ID, as applicable) for the communication device 110 through which the user 108 submitted the application, etc.

With reference to FIG. 3, in now applying the features of the present disclosure to the request, the identity network 102 initially receives the request for the assessment metric from the relying party, at 302, and calculates the assessment metric for the identity, at 304, where the metric is indicative of a likelihood that the identity provided by the user 108 is a synthetic identity (or not). In this exemplary embodiment, the calculation of the assessment metric (at 304) is separated into multiple sub-operations in which multiple different scores are generated (or calculated), each including and/or utilizing varying combinations of data and each calculated by a different one of the scoring engines 112-118.

Specifically in the method 300, the scoring engine 112 retrieves, at 306, the feature data and the device ID from memory (e.g., the memory 204, etc.) of the identity network 102 (or, alternatively, receives, at 306, the feature data from the request for the interactions between the user 108 and the application interface(s) of the relying party 104, as well as the device ID for the user's communication device 110). The feature data includes, as explained above, a rate or cadence of completing the application interface(s), a movement between fields of the interface(s), a progression through the interface(s) (e.g., a movement from field to field, or circling back to prior fields (e.g., indicative of bot activity, etc.), etc.), auto-complete or cut-and-paste entry of data into the fields (e.g., indicative of a user providing responses who is not familiar with the data being provided, etc.), an omission of optional fields and error incidence rate in providing data to the fields (e.g., higher error incidence rates may indicate a user not familiar with the data being provided, etc.), a time to complete the application, etc.

The feature data is then reduced, by the scoring engine 112, to a behavioral numeric value based on a gradient boosting technique, where a generally high value indicates a synthetic identity and a generally low value indicates a real identity. For instance, the numeric value may be provided by the scoring engine 112 on a scale of 0 to 1000, where a score of 800 or above may indicate a high risk that the provided identity is a synthetic identity and a score of 400 or below may indicate a low risk of such. In this embodiment, the feature data is reduced to a generally low numeric value (e.g., 400 or below, etc.), indicating that the identity received from the user 108 is a real identity. In connection therewith, in the above example, the feature data captured for the user 108 includes a generally quick rate or time of progression or cadence by the user 108 in completing the interface(s) and the overall application (e.g., about five minutes, etc.), an indication that optional fields were left blank, an indication that the fields were filled in succession, an indication that data was pasted into fields, and an indication that movement was by tab between fields, all of which reduces (when considered together) to a generally low behavioral numeric value for the feature data in this example.

In addition, the device ID (e.g., the MAC address in this example, etc.) of the communication device 110, as captured by the relying party 104 and as transmitted to the identity network 102, is used, by the scoring engine 112, to generate a device ID numeric value. For instance, this numeric value may again be provided by the scoring engine 112 on a scale of 0 to 1000, where a score of 900 or above may indicate a high risk that the provided identity is a synthetic identity and a score of 500 or below may indicate a low risk of such. When the device ID is associated with other attempts to interact with the relying party 104 or with attempts to interact with a different relying party (not shown), using the same identity (as recognized based on prior verification requests stored in memory of the identity network 102), it is reduced to a numerical score indicative of a real identity (because all application requests using the identity appear to originate from the same communication device 110). In this example, as indicated above, the MAC address for the same communication device 110 is associated with four prior applications associated with the synthetic identity. As such, in this case, the numeric value for the user's device ID will be generally less than 500, since all applications originated from the same communication device 110 and all involve the same presented identity. Conversely, when the device ID of the communication device 110 is associated with other attempts to interact with the relying party 104, or with a different relying party (not shown), each using a different identity, the scoring engine 112 generates a numerical value, based on the device ID, indicative of a synthetic identity (e.g., a value above 800, above 900, etc. since multiple different identities are tied to the same device 110; etc.).

The scoring engine 112 then calculates, at 308, a device behavior score for the provided identity (e.g., again on a scale of 0 to 1000, etc.) based on the discrete numeric values generated for the feature data and the device ID, through use of machine learning techniques, such as, for example, gradient boosting, etc. In connection therewith, the device behavior score is a dynamic score based on data elements tied to each of the discrete numeric values relating to the feature data for the user 108 and the device ID data for the user's communication device 110. For instance, if a lot of data elements tied to the user's interaction with the interface(s) associated with preparing the application for the credit account are unusual (e.g., tabbing between data fields, pasting all responses, high error incidence rate, etc.), then the behavioral numeric value will have more weight in the behavior score as compared to the device ID numeric value, and vice versa (e.g., the device ID numeric value may have more weight in scenarios where several different identities are associated with the same device ID, etc.). Importantly, the device behavior score, taking into account the different discrete numeric values generated above, is not a static breakdown between the values. In any case, in the above example, the two generally low numeric values for the feature data and the device ID will result in a generally low value for the device behavior score for the user 108.

Next, or at the same time, or prior (again, in response to the request from the relying party 104), the scoring engine 114 retrieves, at 310, user profile data for the user 108 from memory (e.g., the memory 204, etc.) of the identity network 102, based on at least one attribute of the provided identity, such as, for example the name or mailing address included in the provided identity, the social security number included in the provided identity, etc. (or, alternatively, receives, at 310, such data from the request). The user profile data generally includes prior data associated with the attribute (and potentially prior data associated with other attributes)

and stored at the identity network 102, for example, in connection with prior verification requests received by the identity network with regard to the identity provided by the user 108. Specifically, as indicated above, the user profile data may include a history of account applications associated with the provided identity (e.g., indicative of velocity of such applications, the type of the applications (e.g., applications for credit accounts, automobile loans, mobile phone subscriptions, etc.), and coverage of applications, etc.). In this example, as explained above, the user 108, through the synthetic identity, has applied for four prior accounts/loans over the past fourteen months, with one related to an automobile and the remainder for different credit accounts.

Once the user profile data is retrieved by the identity network 102, it is combined with the identity data included in the instant application request received from the relying party 104. And, the scoring engine 114 then calculates, at 312, based on a logistic regression, for example, a user profile score for the identity (e.g., again on a scale of 0 to 1000, etc.). For instance, if a velocity (e.g., a total number, etc.) of financial services applications tied to the identity (e.g., credit applications, loan applications, mortgage applications, etc.) is very high in a short period of time (e.g., within a given time interval, etc.) and the credit score tied to the identity does not have any tenure, then the scoring engine 114 may generate a score well above 800 or 900 (on the scale of 0 to 1000), which represents a high risk case. In the above example, the scoring engine 114 determines that the user 108, through the synthetic identity, has applied for the four prior accounts/loans over the past fourteen months, with a credit score tied to the identity for only the same fourteen months, thereby resulting in a generally high user profile score for the identity.

At 314, again in response to the request from the relying party 104 (and either, before, at the same time, or after operations 306-312 or 318-320), the scoring engine 116 retrieves fraud profiles from memory (e.g., the memory 204, etc.) of the identity network 102 (or, alternatively, receives, at 314, such fraud profiles). The fraud profiles include confirmed fraud instances in general, along with the attributes of the identity presented in connection with the fraud instances (e.g., whereby the attributes from the fraud profiles may be compared to the attributes of the identity provided by the user 108, etc.). The scoring engine 116 then calculates, at 316, a fraud profile score (e.g., again on a scale of 0 to 1000, etc.) for the identity, for example, based on an alternating decision model that takes into account the retrieved prior fraud profiles. For instance, if one or more of the identity attributes (e.g., account numbers, etc.) tied to the applications or financial transactions found in previous confirmed cases of fraud or loss match those associated with the identity provided by the user 108 (e.g., based on profile data for the identity as stored at the identity provider 102, etc.), then the scoring engine 116 will generate a relatively high fraud profile score (e.g., 800 or 900 or higher on the scale of 0 to 1000, etc.). In so doing, the magnitude of the fraud profile score may be dependent on the particular identity attributes that match those of the previous confirmed cases of fraud or loss, and the types of the previously confirmed cases of fraud or loss evaluated. In one example, the fraud profile score may be based on an analysis of previously confirmed cases of fraud or loss relating to the same service for which the user 108 is applying (e.g., prior credit application cases, etc.) and may be based on matching personal identity attributes (e.g., a name, an address, an account number, etc.). In the above example, the scoring engine 116 may determine that multiple attributes from the identity provided by the user 108 are included in previous confirmed cases of fraud (e.g., the social security number, the email address, etc.), thereby resulting in a generally high fraud profile score for the identity.

Finally, again in response to the request from the relying party 104 (and either, before, at the same time, or after operations 306-316), the scoring engine 118 retrieves, at 318, exposure data related to the identity provided by the user 108 (or, alternatively, receives, at 318, such data from the request). The exposure data may include, for example, results of a search of nefarious websites and/or domains (e.g., the dark web, etc.) for a government ID number, employee ID number, email address, phone number, etc. included in the request. When the address or number is found, the search is reduced to a numeric value (e.g., at operation 320 below, etc.) indicative of a high likelihood of the identity being a synthetic identity. The exposure data may also include reputation and tenure data related to the identity presented by the user 108. Such additional data may include, for example, a length of time at a given physical mailing address, as retrieved from the U.S. Post Office (USPS) or the Department of Motor Vehicles (DMV), or such additional data may include a longevity and reputation of a mobile phone number, contract, or email address with a mobile network operator (MNO), etc. For instance, the social security number of the identity provided by the user 108 may be identified in a search of the dark web, and the mailing address associated with the identity may be active and recognized by the USPS for fourteen months. Similarly, the phone number associated with the identity provided by the user 108 may be recognized in data from the MNO associated therewith for eighteen months with no suspicious activity.

Then, based on the retrieved exposure data, the scoring engine 118 calculates, at 320, an exposure behavior score for the identity presented by the user 108, for example, based on an incremental decision tree that accommodates the large number of data elements accounted for by the scoring engine 118 (e.g., again on a scale of 0 to 1000, etc.). In doing so, the scoring engine 118 may apply higher weights to certain data when it is found on nefarious websites and/or domains (e.g., social security numbers, account numbers, etc.) than other data (e.g., email addresses, etc.). As a result, in the above example, the scoring engine 118 may determine a generally high exposure behavior score for the identity (e.g., above 700 or 800, etc.) (e.g., because the social security number of the identity provided by the user 108 may be identified in a search of the dark web, and because the mailing address associated with the identity is active and recognized by the USPS for only fourteen months and the phone number associated with the identity provided by the user 108 is recognized in data from the MNO associated therewith for only eighteen months; etc.).

In the above, in retrieving the various different data and calculating the corresponding scores (at 306-320), the scoring engines 112-118 (e.g., a processor associated therewith, etc.) may retrieve the particular data from the request, or the identity network 102 (e.g., a processor associated therewith, etc.) may extract the particular data from the request and transmit it to the scoring engine 112.

Then in the method 300, once the scores from the different scoring engines 112-118 are generated, the identity network 102 aggregates the scores, at 322, into the assessment metric (e.g., again on a scale of 0 to 1000, etc.). The scores may be aggregated into the assessment metric by simply averaging the scores, adding the scores, etc. What's more, the individual scores may be weighted in the aggregation, such that the device behavior score may have more impact on the assessment metric than the user profile score. It should be appreciated that the weighting of the different scores may vary depending on the identity network 102, the relying party 104 or even the identity being presented by the user 108. For instance, in the above example, the scoring engines 114 and 118 may generate a generally high score based on an application velocity by the user 108 being high and a lack of reputation/tenure for the identity attributes provided by the user 108.

And, following the aggregation, the assessment metric is transmitted, by the identity network 102, at 324, to the relying party 104. Thereafter, the relying party 104 receives the assessment metric, evaluates the assessment metric (e.g., against a threshold, etc.), and may rely on the assessment metric to proceed in opening the credit account for the user 108, or not. For instance, the relying party 104 may compare the assessment metric to a threshold and decline further interaction with the user 108 if the assessment metric fails to satisfy the threshold (e.g., decline any transaction or application if the assessment metric is less than 800, etc.). Additionally, or alternatively, the relying party 104 may compare the assessment metric to multiple thresholds, and again decline further interaction with the user 108 if the assessment metric fails to satisfy a first threshold (e.g., decline any transaction or application if the assessment metric is less than 800, etc.) but implement additional security if the assessment metric is within a second threshold (e.g., implement the additional security if the assessment metric is between 600 and 800, etc.).

In view of the above, the systems and methods herein uniquely provide for proactive monitoring of synthetic identity fraud. In so doing, different levels of monitoring are utilized to generate an improved metric, in that additional data not previously utilized may now be accounted for. In connection therewith, the systems and methods herein permit identification of synthetic identities based on various aspects of the synthetic identities and presentment of the same. In particular, when a user presents an identity to a relying party in connection with a network communication to the relying party (e.g., in connection with an online application for an account at the relying party, etc.), certain data is gathered about the application process by the relying party (e.g., feature data, etc.) and is provided, along with identity data received from the user (as part of filling out the application), in a request from the relying party to an identity network. The identity network, in turn, generates an assessment metric for the user and the presented identity, based on the received data, which is indicative of a likelihood that the identity is a synthetic identity (or not). Specifically, as provided herein, the assessment metric is the aggregate of one or more of a device behavior score, a user profile score, a fraud profile score, and/or an exposure score. The identity network then transmits, in response to the request, the assessment metric for the identity to the relying party, whereupon the relying party is able to assess the identity of the user based on the metric. In this manner, the relying party is provided with an assessment of the identity presented by the user sufficient to either assume the risk of interacting with the user, or to terminate the interaction or require further verification of the user's identity.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, a request from a relying party to assess validity of an identity indicated by a user in a network communication between the user and the relying party, the request including identity data associated with the identity indicated by the user, feature data associated with submission of the network communication by the user to the relying party, and a device ID for a communication device associated with the user and used to submit the network communication; (b) parsing the identity data, the feature data, and the device ID from the request and storing the identity data, the feature data, and the device ID in a data structure; (c) calculating, by the computing device, an assessment metric representative of the validity of the identity indicated by the user, the assessment metric based on at least one score derived from the identity data, the feature data, and the device ID; (d) transmitting, by the computing device, the assessment metric to the relying party, whereby the relying party utilizes the assessment metric to determine whether or not to further interact with the user in connection with the network communication; (e) calculating, by a first scoring engine associated with the computing device, the device behavior score based on the feature data and the device ID; (f) calculating, by a second scoring engine associated with the computing device, the user profile score based on the identity data; and (g) calculating, by a third scoring engine associated with the computing device, the fraud score based on the identity data and a data structure of known fraud profiles.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in identifying synthetic identities in connection with network communications, the computer-implemented method comprising:
   receiving, at a computing device, a request from a relying party for an identity asserted by a user to the relying party, the request including identity data indicative of the identity, feature data associated with the user asserting the identity through a web interface of the relying party, and a device ID for a communication device used to access the web interface of the relying party;
   storing the identity data, the feature data, and the device ID in at least one data structure in a memory;
   calculating, by the computing device, a fraud profile score, based on the identity data and a data structure of known fraud profiles;
   aggregating, by the computing device, the fraud profile score and at least one of a device behavior score, a user profile score, and/or an exposure behavior score into a metric indicative of a likelihood that the identity asserted by the user is a synthetic identity; and
   transmitting, by the computing device, the metric to the relying party, whereby the relying party relies on the metric to determine whether or not to further interact with the user, based on the asserted identity.

2. The computer-implemented method of claim 1, further comprising calculating the device behavior score, based on the feature data and the device ID; and
   wherein the feature data includes at least one of: a sequence progression through multiple fields included in the web interface; a cadence of progression through the multiple fields included in the web interface; and/or omission of optional ones of the multiple fields included in the web interface.

3. The computer-implemented method of claim 2, wherein calculating the device behavior score includes calculating the device behavior score based on prior assertions of the identity or a different identity from the communication device associated with the device ID.

4. The computer-implemented method of claim 1, wherein the metric includes a weighted average of the fraud profile score and the at least one of the device behavior score, the user profile score, and/or the exposure behavior score into the metric.

5. The computer-implemented method of claim 1, further comprising:
   calculating, by a scoring engine associated with the computing device, the user profile score based on a velocity of one or more applications tied to the identity indicated by the identity data; and
   calculating, by the computing device, the device behavior score, based on the feature data and the device ID; and
   wherein aggregating the fraud profile score and at least one of the device behavior score, the user profile score, and/or the exposure behavior score into the metric includes aggregating the fraud profile score, the device behavior score, and the user profile score into the metric.

6. The computer-implemented method of claim 1, further comprising calculating, by the computing device, the fraud profile score based on a number of identity attributes of the identity asserted by the user included in previous confirmed cases of fraud from the data structure of known fraud profiles.

7. The computer-implemented method of claim 6, wherein the identity attributes include a social security number.

8. The computer-implemented method of claim 1, further comprising calculating, by a scoring engine associated with the computing device, the exposure behavior score based on a presence of at least a portion of the identity data on a nefarious website; and
   wherein aggregating the device behavior score and at least one of the fraud profile score, the user profile score, and/or the exposure behavior score into the metric includes aggregating the device behavior score and at least the exposure behavior score into the metric.

9. The computer-implemented method of claim 1, wherein the relying party includes a banking institution, and wherein the web interface includes a web-based application for a new account with the relying party by the user.

10. A system for use in identifying synthetic identities in connection with network communications, the system comprising an identity network computing device and a first scoring engine associated with the identity network computing device;
    wherein the identity network computing device is configured to:
       receive a request from a relying party for an identity asserted by a user to the relying party, the request including identity data indicative of the identity, feature data associated with the user asserting the identity through a web interface of the relying party, and a device ID for a communication device used to access the web interface of the relying party; and
store the identity data, the feature data, and the device ID in at least one data structure;
wherein the first scoring engine is configured to retrieve the identity data from the at least one data structure and calculate a fraud profile score, based on the identity data and a data structure of known fraud profiles; and
wherein the identity network computing device is further configured to:
aggregate the fraud profile score and at least one of a device behavior score, a user profile score, and/or an exposure behavior score into a metric indicative of a likelihood that the identity asserted by the user is a synthetic identity; and
transmit the metric to the relying party, whereby the relying party relies on the metric to determine whether or not to further interact with the user, based on the asserted identity.

11. The system of claim 10, wherein the relying party includes a banking institution, and wherein the web interface includes a web-based application for a new account with the relying party by the user.

12. The system of claim 10, further comprising a second scoring engine, which is configured to:
calculate a behavioral numeric value for the identity indicated by the user based on one or more of: a time by the user to complete an application including multiple fields of the web interface, omission of optional ones of the multiple fields, and/or an indication that data was pasted into ones of the multiple fields of the web interface;
calculate a device ID numeric value for the communication device associated with the user based on the device ID and a number of applications previously submitted by the user, via the communication device, for new accounts; and
aggregate the behavioral numeric value and the device ID numeric value into the device behavior score; and
wherein the metric is the aggregate of the fraud profile score and at least the device behavior score.

13. The system of claim 10, further comprising a second scoring engine, which is configured to retrieve the identity data from the at least one data structure and to calculate the user profile score based on the retrieved identity data; and
wherein the retrieved identity data includes a number of applications submitted by the user over a time interval using the identity asserted by the user and a duration of a credit score tied to said identity; and
wherein the metric is the aggregate of the fraud profile score and at least the user profile score.

14. The system of claim 13, further comprising a third scoring engine, which is configured to retrieve the identity data from the at least one data structure and to calculate the exposure behavior score based on a presence of one or more identity attributes of the identity asserted by the user being in results of a search of one or more nefarious websites; and
wherein the metric is the aggregate of the fraud profile score and at least the user profile score and the exposure behavior score.

15. A non-transitory computer-readable storage medium comprising executable instructions for use in identifying synthetic identities in connection with network communications, which when executed by at least one processor, cause the at least one processor to:
receive a request from a relying party for an identity asserted by a user to the relying party, the request including identity data indicative of the identity, feature data associated with the user asserting the identity through a web interface of the relying party, and a device ID for a communication device used to access the web interface of the relying party;
store the identity data, the feature data, and the device ID in at least one data structure in a memory;
calculate a fraud profile score, based on the identity data and a data structure of known fraud profiles;
aggregate the fraud profile score and at least one of a device behavior score, a user profile score, and/or an exposure behavior score into a metric indicative of a likelihood that the identity asserted by the user is a synthetic identity; and
transmit the metric to the relying party, whereby the relying party relies on the metric to determine whether or not to further interact with the user, based on the asserted identity.

16. The non-transitory computer-readable storage medium of claim 15, wherein the executable instructions, when executed by at least one processor, cause the at least one processor to calculate the device behavior score, based on the feature data and the device ID; and
wherein the executable instructions, when executed by at least one processor, cause the at least one processor, in aggregating the device behavior score and at least one of the fraud profile score, the user profile score, and/or the exposure behavior score into the metric, to aggregate the device behavior score and at least the device behavior score into the metric.

17. The non-transitory computer-readable storage medium of claim 15, wherein the executable instructions, when executed by at least one processor, cause the at least one processor to calculate the exposure behavior score based on a presence of at least a portion of the identity data on a nefarious website; and
wherein the executable instructions, when executed by at least one processor, cause the at least one processor, in aggregating the device behavior score and at least one of the fraud profile score, the user profile score, and/or the exposure behavior score into the metric, to aggregate the device behavior score and at least the exposure behavior score into the metric.

18. The non-transitory computer-readable storage medium of claim 15, wherein the relying party includes a banking institution, and wherein the web interface includes an application for a new account with the relying party by the user.

* * * * *